United States Patent [19]

Sanchez Aguilar et al.

[11] Patent Number: 4,589,445

[45] Date of Patent: May 20, 1986

[54] SPOUT OPERATED VALVE

[76] Inventors: Ricardo B. Sanchez Aguilar, Escocia 32, Col. del Valle, Del. Benito Juarez, 03100, Mexico City; Francisco R. Mendez, Calzada Arenal 477, Col Tepepan, Xochimilco, Mexico City; Luis F. Equihua Zamora, Fidel 12, 2a col del Periodista, CP 03620, Mexico City; Carlos D. Soto Curiel, Cerrada de Amatista 5, Col Valle Escondido, Tlalpan, Mexico City, all of Mexico

[21] Appl. No.: 574,762

[22] Filed: Jan. 27, 1984

[51] Int. Cl.⁴ .............................................. F16K 3/00
[52] U.S. Cl. .................................. 137/616.7; 137/615; 137/801; 137/798; 285/354; 285/392
[58] Field of Search ..................... 137/616.7, 798, 615, 137/801; 285/354, 387, 388, 392, 415; 251/286

[56] References Cited

U.S. PATENT DOCUMENTS

| 67,214 | 7/1867 | Pollard | 137/616.7 |
| 118,505 | 8/1871 | Ames | 137/616.7 |
| 473,325 | 4/1892 | Merrill | 137/616.7 X |
| 861,477 | 7/1907 | Nicewarner | 137/616.7 |
| 913,949 | 3/1909 | Gold | 137/616.7 X |
| 2,134,966 | 11/1938 | Boscow et al. | 137/616.7 X |
| 2,545,620 | 3/1951 | Lamoureux | 137/616.7 X |
| 2,790,632 | 4/1957 | Mellette | 137/616.7 X |
| 4,083,383 | 4/1978 | Antoniello | 137/616.7 |

FOREIGN PATENT DOCUMENTS 2046406  11/1980  United Kingdom ............. 137/616.7

Primary Examiner—Gerald A. Michalsky
Attorney, Agent, or Firm—Beveridge, DeGrandi & Weilacher

[57] ABSTRACT

A valve or liquid dispenser which regulates the flow of liquid by means of the movement of its spout, consisting basically of a body of two main parts, one of which is coupled by means of an integrated tube, which may require an adapter, to the liquid outlet, and the other is coupled to the spout or final outlet tube, both parts having ducts or passages for the passage of liquid which, depending on their relative position, allow for the regulation of the desired flow rate, including a mechanism for the adjustment of pressure and for the compensation of wear between said main parts, which prevents leaks and secures the position of the spout or final outlet tube.

8 Claims, 10 Drawing Figures

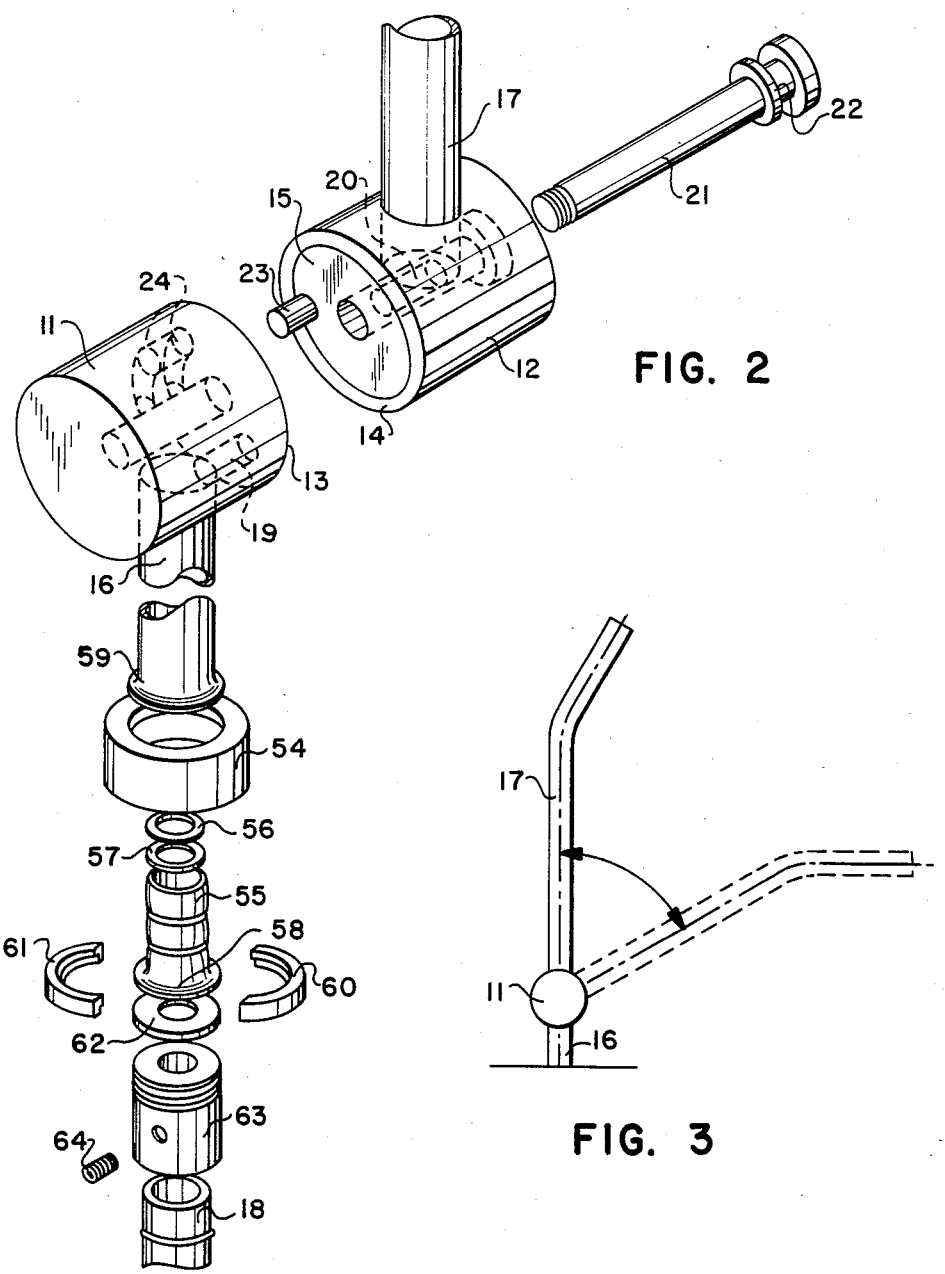

FIG. 8
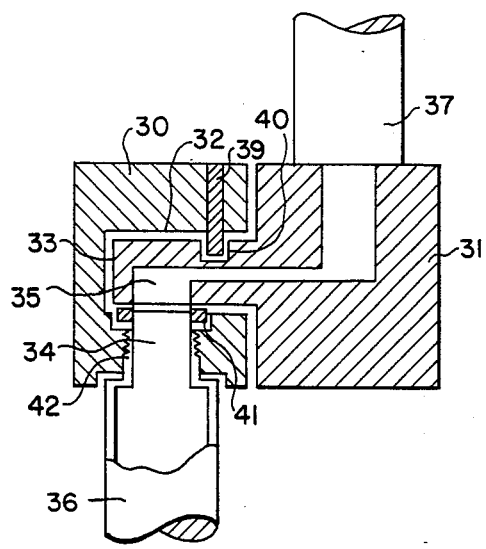
FIG. 9
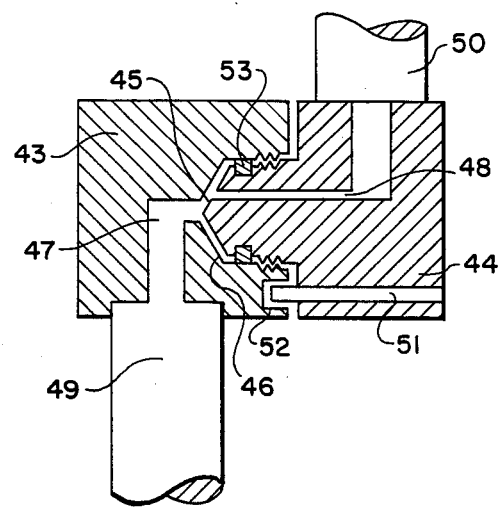
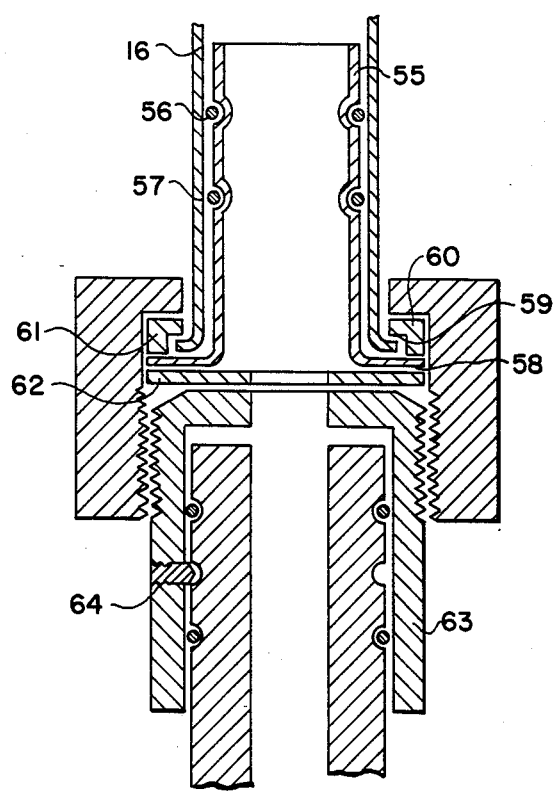
FIG. 10

SPOUT OPERATED VALVE

This invention relates to an improved valve or faucet or liquid dispenser for the regulation of the flow rate of the liquid delivered. More particularly, this invention relates to an improved valve or faucet which in its preferred form regulates the flow rate by the simple up and down movement of its spout, eliminating the need to operate knobs or handles for the regulation of the flow rate, with the resulting reduction of liquid spenditure, time and effort.

BACKGROUND AND SUMMARY OF THE INVENTION

In common mixing valves, knobs or handles regulate the flow rate and the mix (i.e., temperature) of the liquid delivered. Also, there are faucets or valves operated by a single lever. These valves have several undesirable features. The spout is always in its position, and it clutters the space above the sink or receptacle. Even though the spout generally swivels to left and right, the liquid delivered can flow out of the sink or receptacle, unless it is handled carefully or the flow is shut off. In addition, the single lever valves have a large number of parts which make them expensive and which makes for costly maintenance and replacement of parts.

In the case of simple valves or faucets, for one fixed type or temperature or liquid (i.e., cold water), the use of the common knob requires excessive time to regulate the flow. It also requires a large number of parts which make it expensive.

In addition, in places such as laboratories or hospitals, where it is convenient or necessary for the hand not to touch knobs or levers, common valves incorporate a long lever which can be operated with the arm; others incorporate a mechanism for knee operation or pedals for foot operation. All these models are expensive.

The basic object of this invention is to incorporate the regulation of the flow rate into the spout of the valve itself, in such a manner that a simple movement of the spout controls the flow rate. This movement can be done with the touch of a finger, or with any part of the hand, or with the arm. The movement can also be done with an object held in the hand, such as a plate when washing dishes, eliminating the need to have a free hand, and thus making the washing operation faster, more comfortable and convenient. In addition, in its preferred form, the up and down movement of the spout frees the washing area of the sink or receptacle so that it is used more efficiently, resulting in a faster and more convenient operation altogether. Also, significant quantities of liquid can be saved since it is easy and fast to open or shut the flow of liquid, which in places where the cost of water (or other liquids) is high, make the valve economically attractive to the user.

It is another object to provide a valve in which wear items are reduced to a minimum and are all relatively inexpensive and readily replaceable.

It is still a further object to provide a valve which is mechanically reliable and not prone to leak.

With these and various other objects in view, the invention consists of certain novel features of construction and operation, as will be more fully described and particularly pointed out in the specification, drawings and claims appended hereto.

In the drawings, where the preferred embodiments of the device are shown,

FIG. 2 is a blown up isometric drawing of the valve, in its preferred embodiment;

FIG. 3 is a lateral view of the valve, showing its movement;

FIG. 8 is an elevation of a longitudinal section showing the inside of the valve in an alternative embodiment;

FIG. 9 is an elevation of a longitudinal section showing the inside of the valve in a further alternative embodiment;

FIG. 10 is an elevation of a longitudinal section showing one possible adapter used to install the valve in conventional mixing systems.

DETAILED DESCRIPTION OF THE INVENTION

Figure 1:
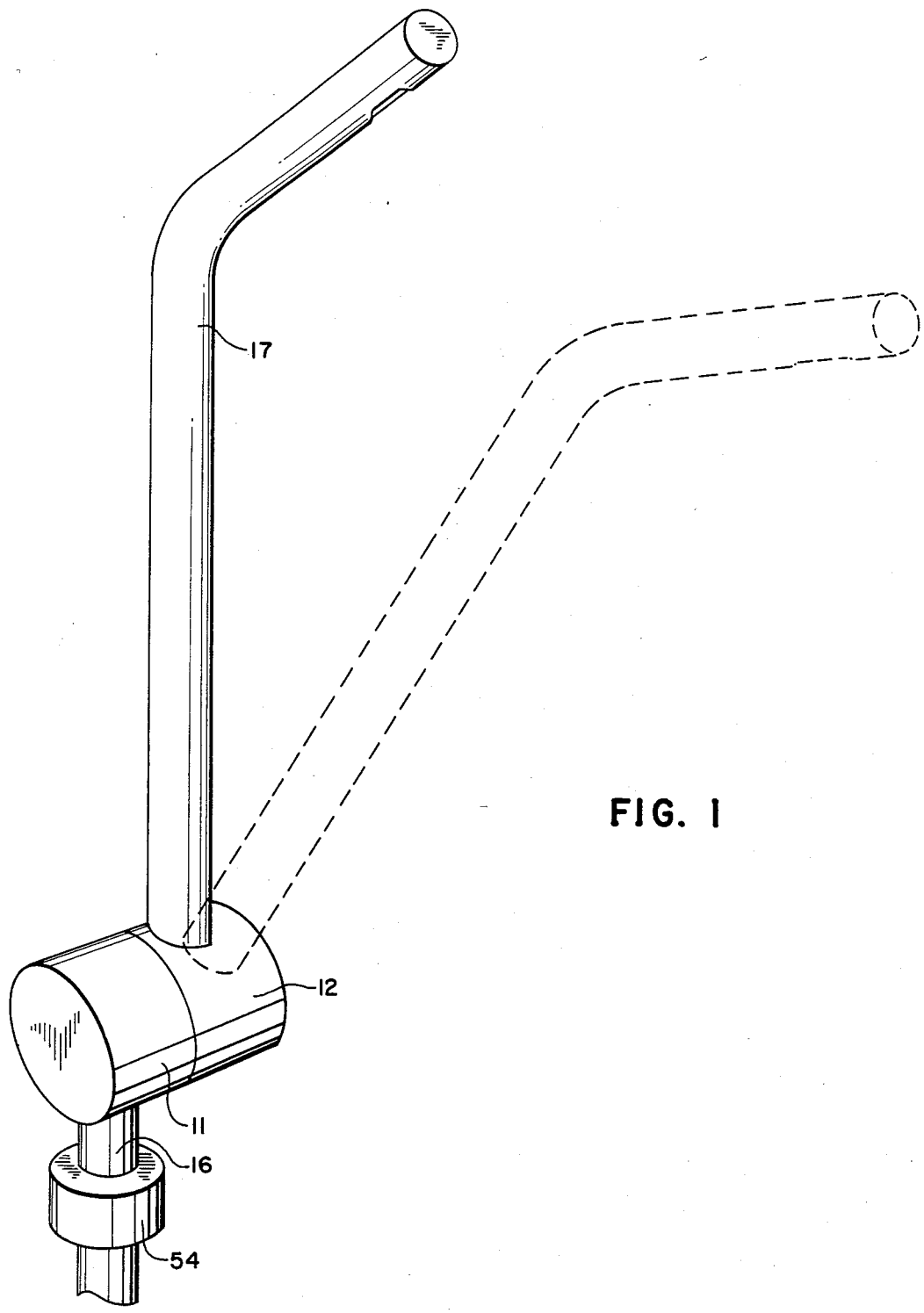
FIG. 1 is a conventional perspective drawing of the valve.

With reference to these drawings, FIG. 1 shows the valve, consisting of the spout 17, the body formed by the two main parts 11, 12, the inlet tube 16, and the adapter made of various parts.

Figure 4:
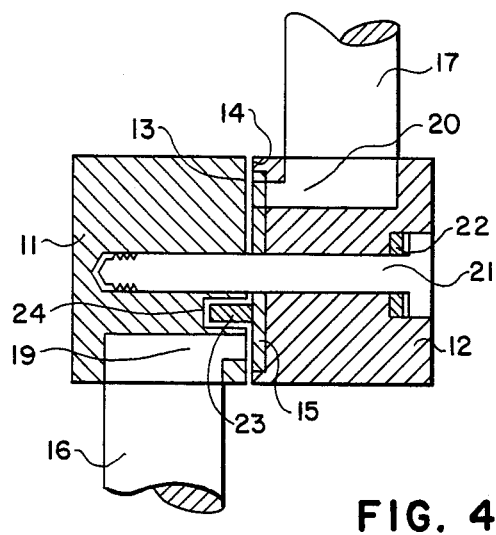
FIG. 4 is an elevation of a longitudinal section, showing the inside of the valve in its preferred embodiment.

FIGS. 2 and 4 show the inside of the valve in its preferred form. The rotation of part 12 in relation to part 11 regulates the flow rate, which passes from 11 to 12 through passages 19, 20. Said parts 11, 12 have confronting faces 13, 14 of which at least one has a sealing surface 15 that prevents wear between said faces 13, 14. The rotation of part 12 in relation to part 11 is restricted by a stud 23 fixed in said part 12 which runs in a sectional groove 24 on said face 13. Also, part 11 is attached by means of an integral inlet tube 16 and an adapter made of various parts, to the liquid outlet 18. Said parts 11, 12 are attached to one another by means of a coupling axis 21 that goes through said part 12 and is secured in said part 11 by pressure or as a screw. To adjust the pressure between said parts 11, 12 and thus maintain the desired position of the spout 17, the position of which regulates the flow rate, a spring, or a pressure washer, or an elastic washer 22 is set around said axis 21.

FIGS. 2 and 10 show one adapter to couple the valve to conventional systems or liquid outlets, which consists of a nut 54 which can be conventional or specially designed depending on the type of outlet to which the valve is to be adapted, an inner tube 55 which is located inside the inlet tube 16 and has two grooves to hold two "O" rings 56, 57 and a lip 58, which is larger than the lip 59 of said inlet tube 16, and a lock made of two half circles 60, 61, of variable dimensions so that it can be adapted to different outlets, a seal 62 also of variable dimensions and, according to the type of outlet, it can also include a helm 63 and a bolt 64, to fix the helm to the liquid outlet 18.

Figure 5:
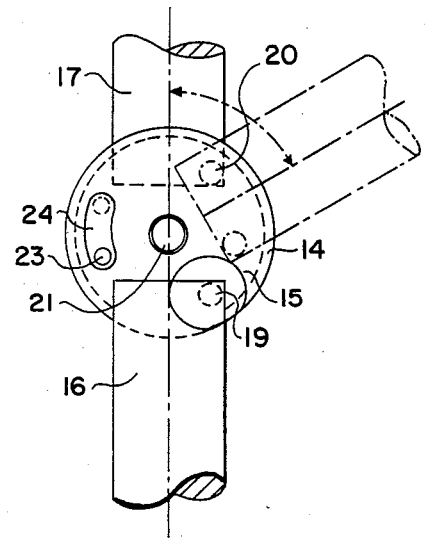
FIG. 5 is an elevation of a cross section showing the inside of the valve in its preferred form.

FIG. 5 shows the inside of the faucet in its preferred embodiment, where the rotation of the spout 17 causes said passages 19, 20 to match, allowing the liquid to flow to said spout 17, and where said stud 23 limits the rotation as it runs in said sectional groove 24.

FIG. 3 shows the up and down movement of the outlet tube or spout 17, which regulates the flow rate.

The larger quantity of liquid flows out when said spout 17 is in its lowest position; that is, towards the user and, as it is pushed upwards, the flow is reduced until it is shut off completely, which happens before it reaches the vertical position. However, said spout 17 can reach backwards to the vertical position so that it can be moved completely out of the work or washing area.

Figure 6:
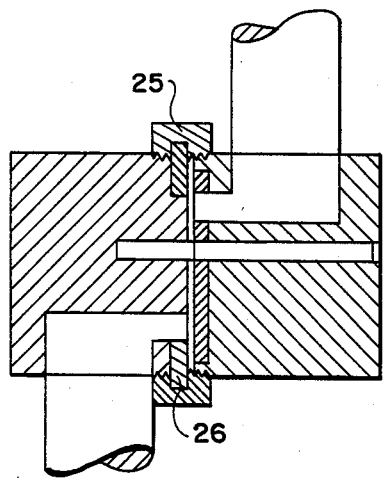
FIG. 6 is an elevation of a longitudinal section showing its preferred embodiment with one alternative.

FIG. 6 shows an alternative in the preferred embodiment, where instead of using said axis 21 and said elastic washer 22, said main parts 11, 12 are fixed together by means of a coupling device 25, and the pressure is adjusted by means of a spring or pressure washer, or elastic washer 26, and where all other components are the same or similar to those described in the preferred embodiment.

Figure 7:
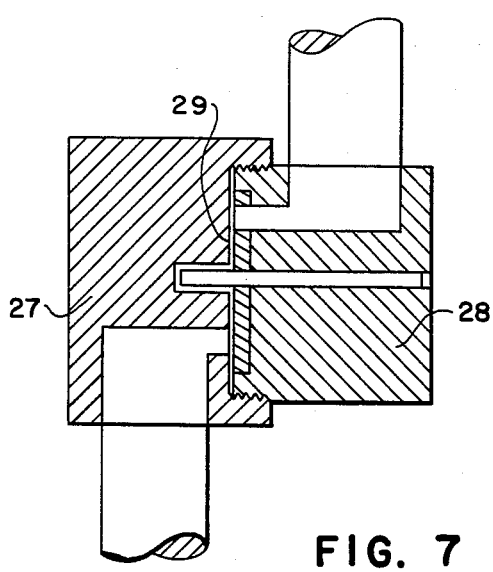
FIG. 7 is an elevation of a longitudinal section showing the inside of the valve in an alternative embodiment.

FIG. 7 shows a second alternative in the preferred embodiment, where instead of using said axis 21 and said elastic washer 22, one of the main parts 27 works also as a coupling device to join itself with part 28, and the pressure is adjusted by means of a spring, or pressure washer, or elastic washer 29, and where all other components are the same or similar to those described in the preferred embodiment.

FIG. 8 shows an alternative embodiment of the valve where the two main parts 30, 31 have cylindrical or conical confronting and sealing faces 32, 33, of which at least one is sealing, having said parts 30, 31 passages 34, 35 for the passage of liquid, which match with one another when said part 31 rotates in relation to said part 30. The rotation is controlled by the spout 37 and it is restricted by the stud 39 which is fixed in said part 30 and runs in the groove 40 in said face 33, of said part 31. In this alternative embodiment the mechanism to adjust the pressure between said parts 30, 31 consists of a spring, or pressure washer, or elastic washer 41, which is adapted to the liquid outlet by means of the same adapter described in FIG. 10.

FIG. 9 shows a further alternative embodiment of the valve, where the two main parts 43, 44 have confronting sealing faces 45, 46, which depending on their relative distance, regulate the flow rate from passage 47 in said part 43, to passage 48 in said part 44, thus allowing the liquid to flow from inlet tube 49 to the spout 50. The distance between said faces 45, 46 is controlled by the movement of the spout 50. The rotation of part 44, in relation to part 43 is restricted by the stud 51, fixed to part 44 which runs in the sectional groove 52, in part 43. The mechanism for the adjustment of pressure between said parts 43, 44 consists of a spring, or pressure washer, or elastic washer 53, which is fixed to part 44, and presses against part 43. The valve, in this alternative embodiment is adapted to the liquid outlet by means of the same adapter described in FIG. 10.

It should be understood that numerous modifications may be made of the preferred form of the invention, or of its described alternatives, without deviating from the broader aspects of the invention.

We claim:

1. A faucet assembly comprising,
   a pair of cylindrical body members removably secured together and having confronting faces in sealing engagement,
   a first body member of said pair adapted for rotation relative to the second body member of said pair about an axis extending longitudinally through said pair of body members,
   a spout having a passageway therethrough, one end of said spout being open for the exit of fluid passing through said passageway, the other end of said spout secured to and in fluid communication with said first body member,
   said first body member having an opening in said confronting face,
   said first body member having a passageway with one end of said passageway in communication with said opening in said confronting face and the other end of said passageway being in communication with the passageway of said spout,
   said second body member having an opening in said confronting face,
   said second body member having a passageway therein with one end of said passageway in communication with said opening in said confronting face,
   said second body member including means for connecting said second body member to a fluid source,
   said connecting means comprising a fluid inlet tube having one end secured to said second body member and being in communication with the other end of said passageway in said second body member, the other end of said inlet tube having an outwardly extending lip about its periphery,
   an inner tube disposed within the lower portion of said inlet tube, said inner tube having an outwardly extending lip about its periphery in contact with said lip of said inlet tube,
   fluid seal means disposed between the outer surface of said inner tube and the inner surface of said inlet tube to prevent passage of fluid through said surfaces,
   a helm having a passageway therethrough and adapted to be secured to an outlet for said fluid source,
   fastening means securing the upper surface of said helm to the lips of said inlet tube and said inner tube,
   whereby when said spout on said first body member rotates said first body member relative to said second body member so as to place said openings in said confronting faces of said body members in direct fluid communication with each other, fluid from said fluid source flows through said passageways and out of said spout, and when said spout rotates said first body member in the opposite direction, said openings in said confronting faces are moved out of communication with each other so that fluid no longer flows between said body member and out of said spout.

2. The faucet assembly of claim 1 wherein said cylindrical body members are joined together by means of a coupling device.

3. The faucet assembly of claim 1 wherein one of said body members acts as a coupling device to couple itself with the other said body member.

4. The faucet assembly as defined in claim 1 wherein at least one of said confronting faces includes a sealing surface which prevents wear against said other face as said faces move relative to each other.

5. The faucet assembly as defined in claim 1 including a pin extending through the longitudinal axis of said body members and securely fastening said body members together.

6. The faucet assembly as defined in claim 5 wherein said pin extends through one of said body members and is secured at one end to the other of said body members, said pin having a head at its other end and pressure means disposed between said head of said pin and said body member to maintain said pair of body members in sealing contact at their confronting faces.

7. The faucet assembly as defined in claim 1 wherein said fastening means include a lock having its inner peripheral portions in contact with said lips of said inlet tube and said inner tube and a nut encircling said lock and having an upper inner portion thereof encircling said lock and pressing downwardly on said lock and said lips as said nut engages and is secured to the upper portion of said helm.

8. The faucet assembly as defined in claim 1 wherein one of said confronting faces has a stud protruding therefrom and the other of said confronting faces has a groove therein receiving said stud, whereby relative rotation of said cylindrical body members is restricted to the travel of said stud within said groove.

* * * * *